United States Patent

[11] 3,573,518

| [72] | Inventor | George N. Liles<br>Southfield, Mich. |
|---|---|---|
| [21] | Appl. No. | 845,292 |
| [22] | Filed | July 28, 1969 |
| [45] | Patented | Apr. 6, 1971 |
| [73] | Assignee | Eaton Yale & Towne Inc.<br>Cleveland, Ohio |

[54] DRIVE MECHANISM
17 Claims, 9 Drawing Figs.

[52] U.S. Cl. ....................................................... 310/103, 310/156
[51] Int. Cl. ........................................................ H02k 49/06
[50] Field of Search............................................ 310/103, 156, 105, 95, 99, 68.3; 318/166, 170, 473, (Cursory); 64/28, 30; 192/88, 82, (T.O.)

[56] References Cited
UNITED STATES PATENTS

| 1,817,660 | 8/1931 | Winther et al. ............... | 310/99 |
| 2,583,523 | 1/1952 | Winther ....................... | 310/103 |
| 2,675,899 | 4/1954 | Bonham ....................... | 192/48 |
| 3,351,167 | 11/1967 | Moss............................ | 192/56 |
| 3,488,535 | 1/1970 | Baermann .................... | 310/93 |

*Primary Examiner*—D. X. Sliney
*Attorney*—Yount and Tarolli

ABSTRACT: Hoist mechanism including a torque-limiting drive for raising the hoist and an overrunning clutch for directly driving the hoist to lower it. Torque limiting is by a hysteresis clutch having temperature-sensing means for sensing heat caused by clutch slipping.

Patented April 6, 1971

INVENTOR.
GEORGE N. LILES
BY
Yount and Tarolli
ATTORNEYS

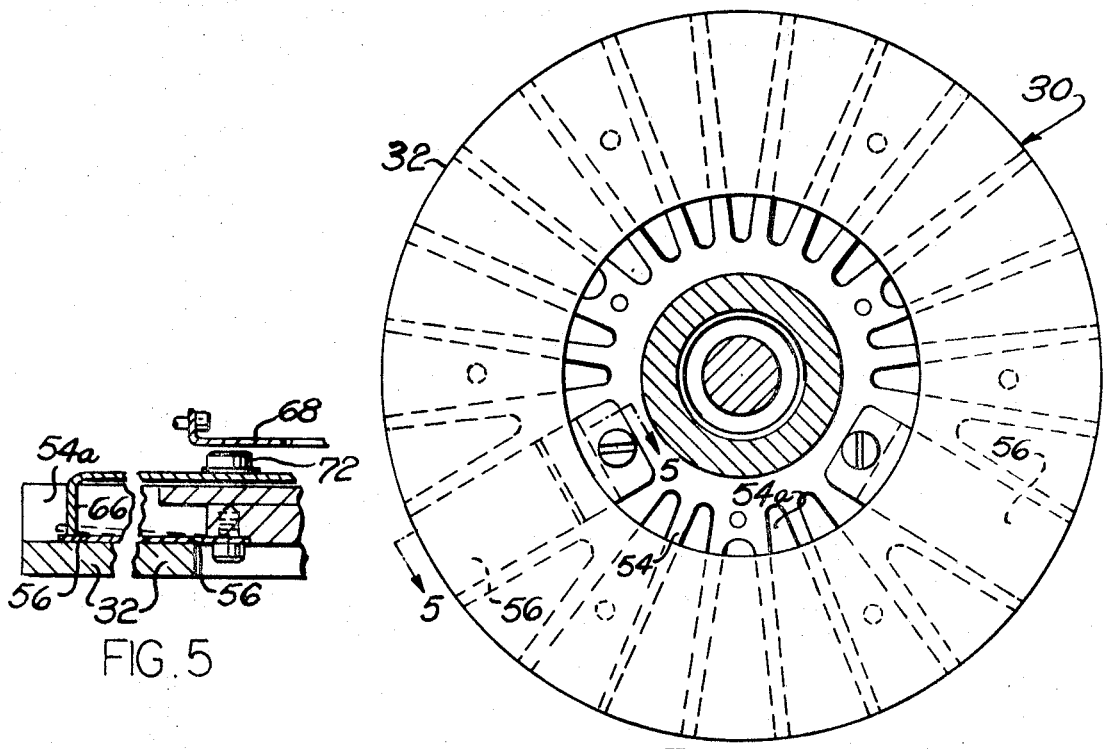
FIG. 5
FIG. 4
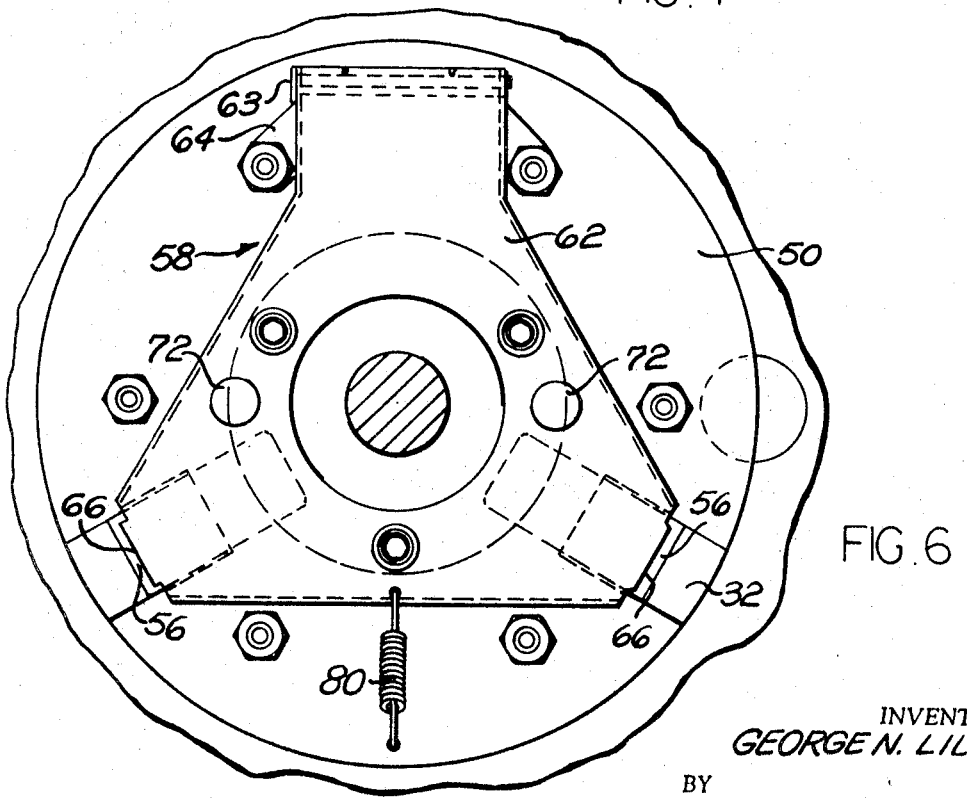
FIG. 6
INVENTOR.
GEORGE N. LILES
BY
Yount and Tarolli
ATTORNEYS INVENTOR.
GEORGE N. LILES
BY
*Young and Tarolli*
ATTORNEYS

DRIVE MECHANISM

The present invention relates to a drive mechanism, particularly a drive mechanism for a hoist, which is to have limited torque-transmitting ability to limit the load which can be driven by the drive. One of the problems in many of the drives in which the torque is limited as by a torque-limiting clutch is that the drive will disengage or lose substantial torque-transmitting characteristics when the torque exceeds the designed limits of the drive. This is objectionable in those drives, such as hoists, where momentary or transient overloads will occur and it is desirable that the drive be capable of transmitting overload torques for brief periods of time to accommodate transient overloads. However, the drive must be such that is will be stopped if the overload is not a transient overload but a sustained overload.

It is an object of the invention to provide a new and improved drive, particularly a new and improved drive for a hoist, in which the mode of operation of the torque-limiting clutch changes when the torque transmitted is above a predetermined maximum normal load torque to enable the torque-limiting clutch to transmit torques greater than the normal maximum rated load and in which a condition associated with the second mode of operation is sensed and the drive is stopped if the second mode of operation continues for a length of time sufficient to indicate a sustained overload.

It is also an object to provide a drive for a new and improved hoist capable of transmitting torque in two directions with the torque transmitted in a hoist-raising direction being limited by a clutch which normally slips only when transmitting an overload torque above normal running torque, but which maintains substantially its torque-transmitting ability under overload slip conditions and which does not have a heat dissipation problem during normal torque-transmitting operations.

A further object of the present invention is to provide a new and improved drive for a hoist in which a clutch having magnetically coupled input and output elements is provided with a heat sensor to sense heating of the clutch on overload and to stop the hoist motor.

A further object of the present invention is to provide a new and improved hoist drive which will transmit overload torques for brief periods but will stop the drive if the overload torque is maintained.

A further object of the present invention is to provide a new and improved drive, particularly a new and improved drive for a hoist, in which a clutch operates to transmit torques below a desired maximum rated load torque without substantial heat generation and to transmit higher torques than the rated maximum load torque with significant heat generation and in which the heat generated is sensed to determine that a non-transient overload exists and to stop the drive in the case of a sustained overload.

It is also an object of the present invention to provide a new and improved drive for raising a hoist and for transmitting a predetermined maximum normal load torque and transient overload torques in a hoist raising direction and in which the drive for raising the hoist is through a hysteresis clutch capable of transmitting normal maximum running torque while operating in the hysteresis mode of operation but which slips at torques above the maximum normal load torque to establish eddy current which increases the torque-transmitting ability of the clutch while generating heat and in which heat-sensing means is associated with the clutch to sense the heat generated by the hysteresis losses and eddy currents to sense nontransient overloads.

It is a further object of the present invention to provide a new and improved drive in which a hysteresis clutch transmits torques up to the normal running load torque by reason of the hysteresis effect of the clutch but slips at torques above the normal maximum load torque to increase the torque-transmitting ability and to generate heat because of the hysteresis loss and eddy current effects and in which a temperature-sensing element is disposed immediately adjacent the hysteresis plate of the clutch to respond to the heat generated and to stop the drive on a sustained overload.

A still further object of the present invention is to provide a new and improved drive, particularly a new and improved hoist drive, in which a clutch unit has torque-limiting clutch means for transmitting torque between the input and output elements of the clutch unit when driving in one direction and an overrunning clutch transmits torque between the elements when driving in a reverse direction.

It is a still further object of the present invention to provide a new and improved drive mechanism, particularly a drive mechanism for a hoist, in which a hysteresis clutch interconnects two members of the drive to transmit torque in a hoist-raising direction and a unidirectional clutch interconnects the two members of the drive to transmit torque in the hoist lowering direction with the hysteresis clutch slipping at loads above normal maximum load to generate increased torque and heat by reason of eddy currents with the heat being sensed to stop the drive in the case of sustained overload.

A further object of the present invention is to provide a new and improved hysteresis clutch in which a temperature-sensing element is associated with the hysteresis plate to perform a control operation when the clutch operates with slippage to generate heat.

A still further object of the present invention is to provide a new and improved hysteresis clutch in which cooperating drive elements of the clutch include a magnet structure having alternate north and south pole faces extending radially of the axis of rotation of the clutch and the other of said clutch elements is a hysteresis plate disposed in a radial plane, the flux path being between adjacent poles of the magnet structure through the hysteresis plate.

A still further object of the present invention is to provide a hysteresis clutch in which permanent magnets are disposed between pole pieces arranged with their pole faces radially of the axis of rotation of the clutch with the pole pieces being alternate north and south poles and the magnets being disposed in faces between the pole pieces with the magnet faces extending in an axial direction and having a larger area than the area of the pole faces enabling a low-density flux magnet to be utilized to provide a relatively high-density flux concentration in the airgap between the magnet structure of the hysteresis clutch and the cooperating hysteresis plate.

Further objects and advantages of the present invention will be apparent from the following detailed description of the preferred embodiment thereof made with reference to the accompanying drawings and forming a part of the present specification for all subject matter disclosed therein and in which:

FIG. 2 is a fragmentary cross-sectional view through the hoist of FIG. 1;

FIG. 5 is an enlarged fragmentary view looking from along line 5-5 of FIG. 4;

Figure 7:
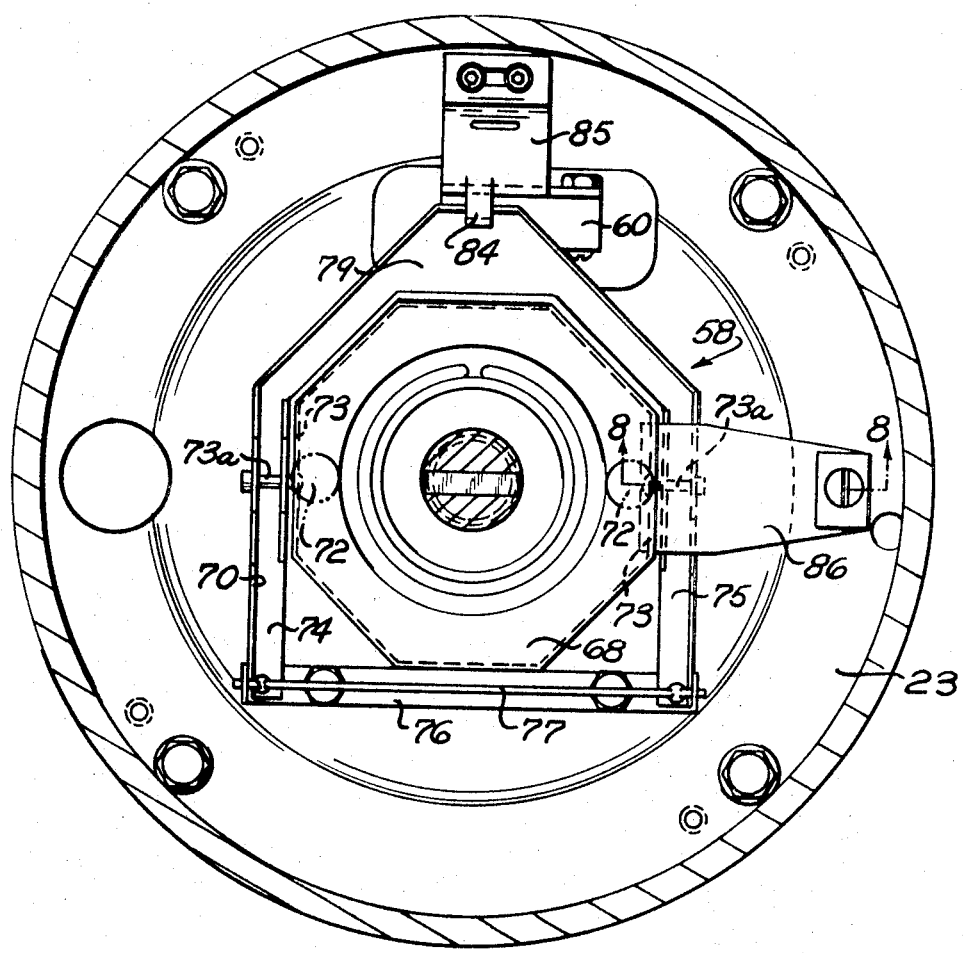
Figure 8:
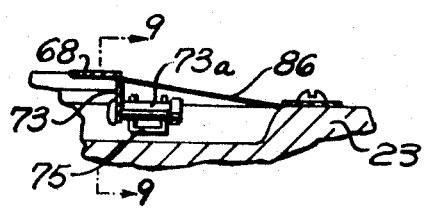
Figure 9:
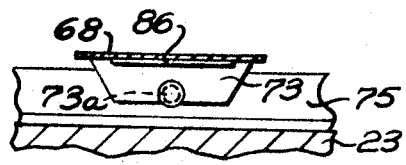

FIGS. 6 and 7 are cross-sectional views looking from line 6-6 and 7-7 respectively of FIG. 2;

FIG. 8 is an enlarged fragmentary view looking from along line 8-8 of FIG. 7; and FIG. 9 is an enlarged fragmentary view looking from along line 9-9 of FIG. 8.

While the present invention is susceptible of the use in drive mechanisms for various purposes where it is desired to limit the torque transmitted by the drive or to provide a torque-limiting drive when the drive is operating in one direction and a nonlimited drive when the drive is operating in a reverse direction, it is particularly suitable for use in a hoist and is herein shown as being embodied in a hoist mechanism.

Figure 1:
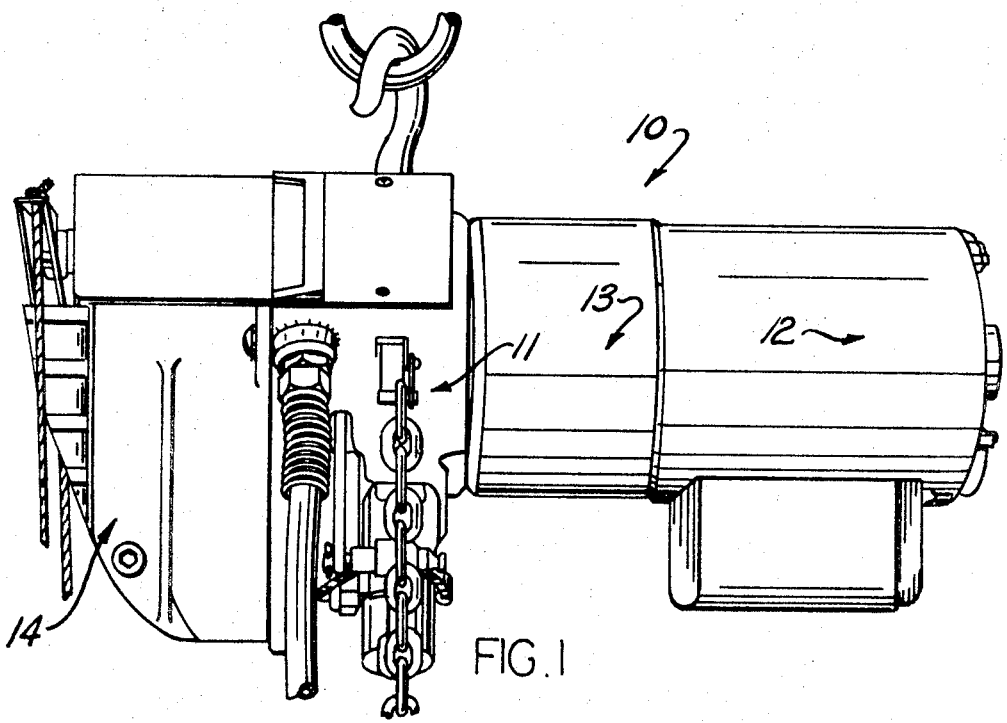
FIG. 1 is an elevational view of a hoist mechanism embodying the present invention.
Figure 3:
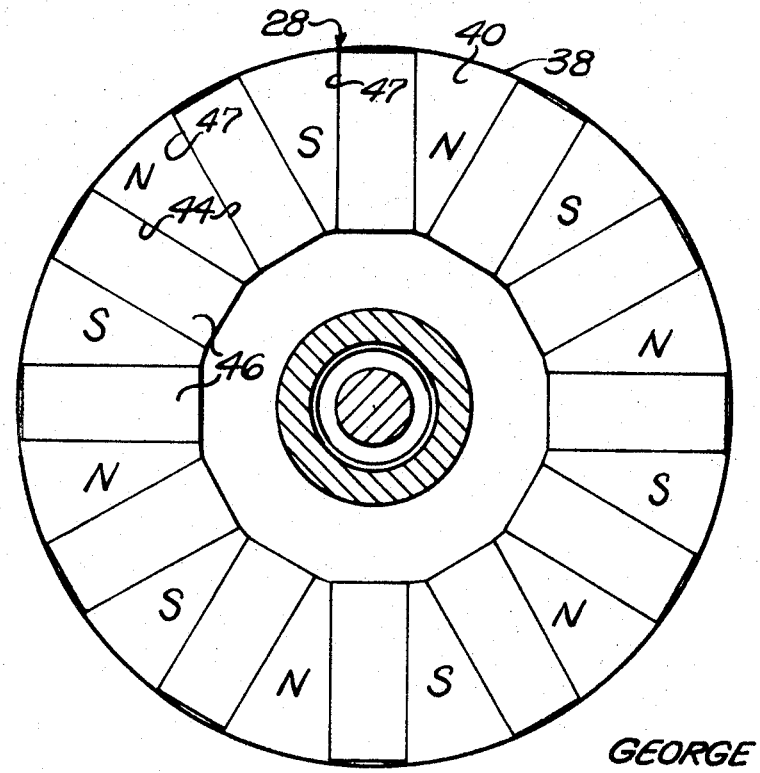
FIG. 3 is a cross-sectional view looking from along line 3-3 of FIG. 2.
Figure 4:
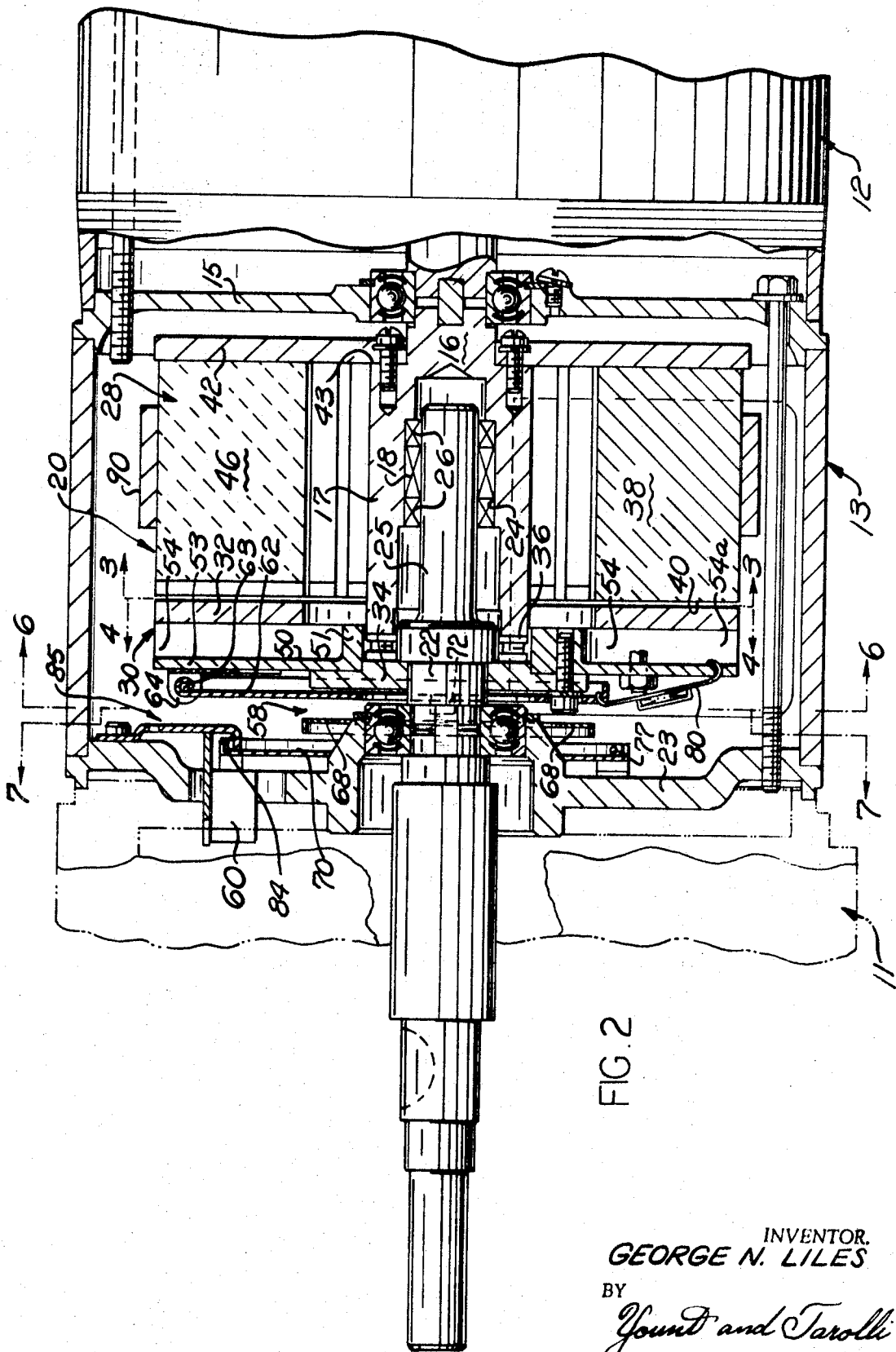
FIG. 4 is a cross-sectional view looking along line 4-4 of FIG. 2.

Referring to the drawings, FIG. 1 shows an electric hoist mechanism 10 which comprises a hoist unit 11 driven by an electric motor 12 through a clutch unit 13. The electric motor 12 and the clutch unit 13 are disposed on one side of the hoist unit 11 and a brake and planetary gearing unit 14 are located on the opposite side of the hoist unit 11 from the motor and clutch. In operation, the motor 12 is operated in one direction to raise the load through the planetary gear unit and in the opposite direction to lower the load. When the electric motor 12 is deenergized after operating the hoist, a brake in the brake and planetary unit 14 is automatically set in a conventional manner to prevent the load from being moved independently of the energization of the motor. When the load is to be lowered, the electric motor must be operated in the hoist-lowering direction to release the brake which has been set and to control the lowering of the load. The torque necessary to initiate the lowering of the load is actually greater than the torque necessary to raise a load below maximum rated load.

The planetary gear and braking unit 14 are conventional and, therefore, have not been shown or described in detail herein. Similarly, the hoist unit is a conventional hoist unit and it also has not been shown or described in detail.

FIG. 2 illustrates the clutch unit 13 which interconnects the drive motor 12 and the hoist through the planetary gear unit 14. The motor 12 drives an input shaft to the clutch unit 13. The input shaft 16 is rotatably supported in a housing wall 15 between the motor 12 and the clutch unit and has an enlarged inner portion 17 which is connected through an overrunning clutch 18 and a hysteresis clutch 20 to drive an output shaft 22 for the clutch unit 13. The output shaft 22 is rotatable in a housing wall 23 between the clutch unit 13 and the hoist unit 11.

The overrunning clutch 18 only transmits torque between the input shaft 16 and the output shaft 22 when the motor is operating in a hoist-lowering direction and will not transmit torque when the motor is operated in a hoist-raising direction. The overrunning clutch 18 is positioned in a bore 24 in the enlarged end 17 of the input shaft 16 of the clutch unit 13 and cooperates with a reduced end portion 25 of the output shaft 22 of the clutch unit 13. The reduced end portion 25 is received in the bore 24 and the overrunning clutch element is disposed in an annular space between the reduced output shaft portion 25 and the sidewall of the bore 24. Roller bearings 26 are also disposed in the bore 24 to rotatably support the reduced shaft portion 25 in the bore 24. The bore 24, the output shaft 22 and its reduced portion 25 and the input shaft 16 are all coaxial.

When the motor 12 is operated in a hoist-raising direction, the torque is transmitted by the hysteresis clutch 20. The hysteresis clutch 20 is a torque-limiting clutch and comprises an annular field magnet structure 28 and a hysteresis output element 30 which comprises an annular hysteresis plate 32. The field magnet structure 28 is an annular structure disposed coaxially about the enlarged portion 17 of the input shaft 16 and is secured to the input shaft 16 for rotation therewith as a unit. The output element of the hysteresis clutch 30 is fixed to a flangelike collar 34 which extends radially outwardly of the output shaft 22 of the clutch unit 13 adjacent the housing wall 23. A thrust bearing 36 is disposed between the flangelike collar 34 and adjacent end of the input shaft 16.

The field magnet structure comprises a plurality of pole pieces 38 arranged circularly about the enlarged portion 17 of the input shaft 16. The pole pieces 38 have pole faces 40 lying in a radial plane adjacent the hysteresis plate 32 but spaced therefrom and extend parallel to the axis of the input shaft 16 from a plate 42. The plate 42 extends radially of the input shaft 16 and it is secured to a radial shoulder 43 formed by the enlarged portion 17 of the input shaft 16. The pole pieces 38 are spaced from each other and are generally V-shaped in cross section with their axially extending sides 44 diverging radially outwardly. The adjacent sides 44 of adjacent pole pieces extend approximately parallel to each other to define a space which is adapted to receive a permanent magnet which is essentially rectangular in cross section.

In the preferred and illustrated embodiment, ceramic magnets 46 are positioned in the spaces between pole pieces 40 with the sides 47 of the magnets 46 engaging the sides 44 of the pole pieces, the sides 44 being the pole faces 47 of the ceramic magnets. The ceramic magnets are positioned so that the poles of the magnets on both sides of each pole piece have the same polarity thereby establishing alternate north and south poles proceeding about the circularly arranged pole pieces.

In the preferred embodiment the areas of the pole faces 47 of the ceramic magnets 46 and of the sides of the adjacent pole pieces are large as compared to the areas of the pole faces 40. As described in more detail hereinafter, this provides for a concentration of the flux at the pole faces of the magnets and enables a low flux density magnet to be utilized. It will be appreciated that the required magnetizing force can be acquired at the pole faces of the pole pieces by increasing the length or height of the ceramic magnets and the pole pieces or otherwise increasing the ratio of the area of the pole faces of the magnets to the pole face of the pole pieces.

The poles of alternate polarity establish fields of magnetic flux between adjacent poles through the hysteresis plate 32. The hysteresis plate 32 is of a high hysteresis loss material and is of a material suitable for permanent magnetism. For example, the plate may be of alnico. The plate 32 is an annular ringlike member having an annular width which corresponds to the height of the pole faces. The hysteresis plate is fixed to a backing plate 50 made of a nonmagnetic material, for example, aluminum. The backing plate 50 is provided with a central hub portion 51 which is bolted to the flangelike collar 34 on the output shaft 22. The backing plate has a flange portion 53 spaced from the hysteresis plate 32 extending radially from the hub portion 51 and a plurality of radially extending ribs 54 disposed between the flange 53 and the hysteresis plate 32. The ribs 54 are spaced from each other and define radially extending spaces 54a between the hysteresis plate 32 and the flange 53 on the backing plate 50.

In operation to raise a load, the hysteresis clutch will transmit a torque from the input clutch element 16 to the output clutch element 22. On raising a load, the hysteresis coupling will supply the same torque as the maximum static torque, not more, or less. This torque dynamically balances the load and accelerates it to the running speed of the motor. When the running speed is reached, or sooner, the clutch falls into synchronism with the motor and acts as a positive coupling. If the load-balancing torque is greater than the torque-transmitting capacity of the clutch, while operating in the hysteresis mode, the clutch 20 will start slipping and eddy currents will be generated in the hysteresis plate. These eddy currents will increase the torque-transmitting ability of the clutch but will also generate heat. If the increased torque is not sufficient to accelerate the load, the load is beyond the capacity of the clutch and the clutch continues to slip and the load is not lifted and a significant quantity of heat is generated. In case of a transient overload, the clutch will stop slipping and generating heat within a brief period of time.

In accordance with the preferred embodiment of the present invention, the clutch unit 20 includes means for sensing the slipping of the clutch for a period of time which would indicate a sustained overload rather than a transient overload. In the preferred and illustrated embodiment, the means for sensing the slipping of the clutch for a period which indicates a sustained overload is a heat sensor which is responsive to the heat generated by the eddy currents. In the preferred embodiment, the heat sensor comprises two bimetallic elements 56 disposed in spaces 54a of the hysteresis output element 30 which are substantially 120° apart. The bimetallic elements 56 are secured to the hub portion 51 of the backing plate and extend outwardly from the hub portion between the hysteresis plate 32 and the backing plate 50. The hub 51 of the backing plate 50 is recessed to receive the radially inner ends of the bimetals 56 and the bimetals extend radially outwardly from the hub immediately adjacent the back of the hysteresis plate 32 and in an unheated condition engage the adjacent inside face of the plate. In the preferred and illustrated embodiment, the bimetals are snap acting and in a cold condition, tend to bow toward the plate 32 and are biased against the plate by the bowing forces. As the bimetals 56 are heated, they will tend to straighten and when heated sufficiently to bow in the opposite direction they will do so with a snap action.

When the eddy currents in the hysteresis plate on slipping generate sufficient heat, the bimetals 56 will snap and this movement away from the annular plate 32 causes a control operation to be performed. In the preferred and illustrated embodiment, the flexing of the outer end of either or both of the bimetals 56 actuates a switch operating mechanism 58 for actuating a switch 60 to open the circuit for operating the hoist motor in a hoist rasing direction. The switch actuating mechanism 58 includes a platelike pivoted lever 62 which is pivoted by a pivot pin 63 to a bracket 64 fixed to the backing plate 50 of the hysteresis clutch on the side of the backing plate facing the housing wall 23 and at a location on the far side of the axis of rotation of the hysteresis output element from the bimetals 56 and approximately 120° from each bimetal. The platelike lever 62, extends along the outer side of the backing plate 50 and around the clutch output shaft 22 of the clutch unit 13 and has spaced stamped projections 66 which are bent to extend inwardly of the backing plate 50 through respective openings in the latter to each terminate immediately adjacent the free end of a respective one of the bimetals 56. When the bimetals 56 flex due to the heat generated by the eddy currents, the platelike lever 62 will be swung about the axis of its pivot pin 63 which extends crosswise of the axis of rotation to move angularly to engage a ring member 68 to move the ring and a gimbal yoke 70 supporting the ring member to effect the actuation of the switch 60.

The platelike lever 62 encompasses the output shaft 22 and has an opening 72 therein for receiving the shaft with sufficient clearance so as to allow the movement of the lever 62 about its pivot axis. A pair of buttons 72 are fixed to the platelike lever 62 and are adapted to engage and operate the ring member 68 upon movement of the platelike member 62. The buttons 72 are disposed on opposite sides of the output shaft 22 of the clutch unit 13 along a line which extends parallel to the axis of pivoting movement of the lever 62 and through the output shaft 22.

The pivoted ring member 68 which is actuated by the platelike lever 62 encircles the output shaft 22 and has spaced ears 73 extending axially from the outer periphery thereof towards the housing wall 23 which are pivoted by pivot pins 73a to spaced arms 74, 75 of the gimbal yoke 70 so that the ring member 68 may rotate about an axis perpendicular to the axis of the output member 22 as the gimbal yoke swings about one end thereof. The gimbal yoke 70 is supported for angular movement by a pivot pin 77, mounted in a bracket 76 mounted on the housing wall 23 on the side of the shaft 22 opposite to the switch 60. The plate 70 extends around the ring member 68 and terminates in a switch-actuating portion 79 immediately adjacent the switch 60. The end portion 79 of the gimbal yoke 70 is free to move angularly about its pivot connection to the frame to operate to the switch 60. The ring member 68 is pivoted in the gimbal plate 70 for rotation about an axis parallel to the line about which the gimbal yoke 70 pivots so that the ring 68 will remain in an essentially radial plane as it is moved axially by the buttons 72 on the platelike lever 62 to swing the gimbal yoke 70 in a direction to operate the switch 60 upon the snapping outwardly of the bimetal 56.

The pivoted platelike lever 62 on the hysteresis clutch output element is stabilized by a spring 80 connected between the free end portion of the lever and the backing plate 50. Also, the ring member 68 is stabilized by a flat leaf spring 86 which has one end fastened to the housing wall 23 and a free end which extends through a slot in one of the ears 73 on the outer peripheral edge of the ring member 62. The spring 86 merely tends to stabilize the ring member 68 in the position shown in FIG. 2 in which the far side of the gimbal plate 70 from the switch 60 is disposed adjacent a stop 84 provided by a bracket 85 fixed to the housing wall 23.

It can now be seen that when the motor is operated in a hoist-raising direction, the clutch 18 will overrun but the hysteresis clutch 20 will transmit torque to raise the load. If the load-balancing torque is greater than that which can be transmitted, without slipping, the clutch will slip while this increases the torque transmitted, the heat generated will cause the bimetals 56 to operate the switch 60 if the slipping continues beyond a brief period.

The overrunning clutch 68 is conventional and well known in the art. Such clutches are commercially available and may be purchased as a unit with the roller bearings 26. Therefore, it has not been shown or described in detail.

The elements of the magnet structure of the hysteresis clutch may be conventionally assembled as by bonding. The preferred construction enables low flux density magnets to be used in view of relatively small pole face area which concentrates the flux. Also, the flux density at the pole faces may be adjusted by adjusting a band 90 of ferromagnetic material encircling the magnets and the pole pieces. Shifting the band axially will adjust the flux strength at the pole face and the maximum torque-transmitting capability of the hysteresis when operating in a synchronized manner.

It will be further appreciated that the disclosed temperature sensor and switch-actuating mechanisms may be associated with an eddy current type clutch or similar clutches to sense overloads or overheating.

I claim:

1. In a hoist having hoisting means driven by a motor, a drive between said hoisting means and motor for transmitting torque in a hoist-raising direction, said drive comprising a hysteresis clutch having a maximum hysteresis torque capability substantially the same as the balancing torque developed by the maximum rated load for the hoist and slipping on overload, and sensing and indicating means for sensing heat generated by the slipping of said hysteresis clutch for indicating clutch overload.

2. In a hoist as defined by claim 1 wherein said hysteresis clutch comprises a hysteresis member and said means for sensing heat comprises a temperature-sensing element immediately adjacent said hysteresis member and responsive to heat generated in the hysteresis member created by said slipping of the clutch.

3. In a hoist as defined in claim 2 wherein said sensing means further comprises a nonrotating device actuated in response to the movement of said temperature responsive element for indicating hoist overload and said temperature responsive element comprises a snap-acting bimetal having a free portion which flexes to actuate said nonrotating device.

4. In a hoist having hoisting means, a motor for raising and lowering said hoisting means, and a drive interconnecting said motor and said hoisting means, said drive comprising first and second coaxially disposed rotatable members, a unidirectional clutch mechanism interconnecting said members for transmitting torque therebetween in a hoist-lowering direction only, and a magnetic second clutch mechanism comprising first and second magnetically coupled elements connected to respective ones of said members for rotation therewith.

5. On a hoist as defined in claim 4 and further comprising control means for sensing slipping of said magnetic clutch mechanism for performing a control operation in response thereto.

6. In a hoist as defined in claim 4 wherein said clutch mechanism is a hysteresis clutch having a hysteresis torque capability approximately the same as the balancing torque of the maximum rated load for the hoist whereby said hysteresis clutch slips on overloads, one of said elements of said clutch mechanism being a hysteresis member and said clutch mechanism including means for sensing heat generated in said hysteresis member on the slipping of the clutch for indicating a hoist overload.

7. A drive mechanism comprising a hysteresis clutch unit having coaxially disposed input and output members, said hysteresis clutch unit comprising first and second cooperating elements connected respectively for rotation with said first and second members, one of said elements being a field magnet structure and the other of said elements being a hysteresis member, said hysteresis clutch unit including sensing means rotatable with said hysteresis member and responsive to a condition indicating hysteresis losses and eddy currents therein for indicating overload.

8. A drive mechanism as defined in claim 7 wherein said sensing means comprises a temperature-sensing device and said mechanism includes means responsive to said temperature-sensing device for performing a control function.

9. A drive mechanism as defined in claim 7 wherein said sensing means comprises a snap-acting bimetal element having a free portion which deflects upon heating, said drive mechanism including indicating means responsive to the deflection of said bimetallic element.

10. A hysteresis clutch comprising a field magnet structure rotatable about an axis and comprised of spaced magnetic pole elements having pole faces arranged about the axis of rotation with said pole faces of the pole elements extending substantially generally radially and facing axially of said axis, said pole elements alternating between north and south poles proceeding about the axis of rotation of the member, said pole elements being separate pieces and said field magnet structure having means for supporting said separate pieces and a member of ferromagnetic material encircling said structure in engagement with said pole pieces, said member of ferromagnetic material being adjustable in an axial direction to adjust the strength of the flux in the airgaps between said magnetic structure and said hysteresis member, a rotatable hysteresis member extending radially of said axis adjacent said faces and the flux.

11. A hysteresis clutch as defined in claim 10 wherein said supporting means comprise a member of ferromagnetic material at the ends of said pole elements opposite to the pole faces thereof.

12. A hysteresis clutch comprising a filed magnet structure rotatable about an axis and comprised of spaced magnetic pole elements having pole faces arranged about the axis of rotation with said pole faces of the pole elements extending substantially generally radially and facing axially of said axis, said pole elements alternating between north and south poles proceeding about the axis of rotation of the member, said pole elements being separate pieces and said field magnet structure having means for supporting said separate pieces and a member of ferromagnetic material encircling said structure in engagement with said pole pieces, said member of ferromagnetic material being adjustable in an axial direction to adjust the strength of the flux in the airgaps between said magnetic structure and said hysteresis member, a rotatable hysteresis member extending radially of said axis adjacent said faces and the flux, and a temperature-sensing device mounted in said hysteresis member for heating by heat generated in said member to indicate a clutch overload.

13. A hysteresis clutch as defined in claim 12 and further comprising a lever member having one end connected to said hysteresis member on one side of said axis and extending along said hysteresis member to terminate on the other side of said axis, said element being on said other side of said axis and engaging and moving said lever member about its said one end upon heating, and control means disposed adjacent said hysteresis member responsive to movement of said lever member for performing a control operation.

14. A magnetic clutch as defined in claim 13 wherein said control means comprises a second member extending on opposite sides of the axis of rotation of said hysteresis member adjacent to said lever in and spaced elements are carried by one of said second member and said lever member to engage the other one thereof upon movement of the lever member by said temperature-sensing element to actuate the second member in a generally axially directive.

15. A clutch unit comprising magnetically coupled input and output members, said unit slipping on overload and generating heat, a temperature-sensing element on one of said members, said element having a free portion movable in response to a heating of said element, a pivoted lever rotatable with said one member and having a portion disposed adjacent said free portion to be engaged and moved thereby on the heating of said element, the pivot axis of said lever being on opposite sides of the axis of rotation of said one member and means responsive to the movement of said lever to perform a control function.

16. A drive mechanism as defined in claim 15 wherein said means responsive to the movement of said lever comprises a third member including portions disposed on opposite sides of said one of said output and input members, and spaced projections on one of said lever and third member, the other of said lever and third member having a ring portion engaged by said projections.

17. A clutch unit as defined in claim 16 wherein said means responsive to the movement of said lever comprises a support member mounted for swinging movement about a first axis offset from and generally perpendicular to the axis of rotation of said one member and means supporting said third member on said support member for swinging movement about a second axis parallel to the first axis whereby said third member may be maintained parallel to a radial plane on the swinging movement of said support member.